United States Patent [19]
Nakao

[11] Patent Number: 4,550,352
[45] Date of Patent: Oct. 29, 1985

[54] HEAD ADJUSTING DEVICE

[75] Inventor: Toshihiro Nakao, Tokyo, Japan

[73] Assignee: Olympus Optical Company Limited, Tokyo, Japan

[21] Appl. No.: 436,684

[22] Filed: Oct. 26, 1982

[30] Foreign Application Priority Data

Oct. 27, 1981 [JP] Japan .................. 56-159938[U]

[51] Int. Cl.$^4$ .................. G11B 5/56; G11B 21/24
[52] U.S. Cl. .................. 360/109; 360/104
[58] Field of Search .................. 360/104, 109

[56] References Cited
U.S. PATENT DOCUMENTS 4,340,919  7/1982  Kato .................. 360/109

*Primary Examiner*—John H. Wolff
*Attorney, Agent, or Firm*—Toren, McGeady, Stanger, Goldberg & Kiel

[57] ABSTRACT

A head adjusting device for use in a tape recorder is disclosed. The device comprises an elastic plate body, a magnetic head fitting member formed by folding the plate body, a magnetic head fixed to the head fitting member and provided to the folded portion correspondingly, an azimuth adjusting mechanism provided to the plate body with a predetermined space for adjusting angular deviation of the head, and a tilt adjusting mechanism provided by screwing the head fitting member to the plate body for adjusting tilt angle of front and rear portions of the head with bias force of the head fitting member.

1 Claim, 5 Drawing Figures 4,550,352

HEAD ADJUSTING DEVICE

BACKGROUND OF THE INVENTION

The present invention relates to a tape head alignment, particularly to a head adjusting device for adjusting angular deviation of a magnetic head and tilt angle of front and rear portions thereof.

In a high-grade tape recorder, generally, azimuth adjustment and tilt adjustment of the magnetic head are performed by worm gears. The worm gears can carry out head alignment within a comparatively short period, but have complicated structure and a great number of components so that large fitting space is required and thus are difficult to use in inexpensive and minimized tape recorder. The utilization of worm gears particularly, is disadvantageous in a super miniaturized tape recorder.

FIG. 1 shows a conventional head adjusting device adopted in the super miniaturized tape recorder. In the figure reference numeral 1 is a strip of a magnetic head fitting plate, to the center portion of which a magnetic head 2 is fixed by a spot welding. As shown in FIG. 2 the fitting plate 1 is fixed its left end to a supporting portion 3a of a base plate 3 by a clamping screw 4. The fitting plate 1 has a notch portion 1a formed at its right end. An azimuth adjusting screw 5 is inserted in the notch 1a and screwed into the base plate through an azimuth adjusting coil spring 6. In FIG. 2 reference numeral 7 is a spacer for adjusting height of the magnetic head 2 and numeral 8 is a tape guide fixed to a side surface of the head 2 for regulating a running path of a magnetic head 9.

This head adjusting device can adjust the angular deviation of the magnetic head 2 by adjusting the screw 5 and vertically rotating the fitting plate 1 around the screw 4 with the bias force of the spring 6.

However, this head adjusting device has only means for adjusting angular deviation of the head 2 by fixing one end of the fitting plate 1 and vertically rotating the fitting plate 1 with azimuth adjusting screw 5, so that in case of adjusting tilt angle of front and rear portions of the head 2 a tilt adjusting mechanism must be provided separately and thus the device becomes large in construction and expensive.

SUMMARY OF THE INVENTION

It is an object of the present invention to overcome the above described disadvantages of the conventional head adjusting device.

It is another object of the present invention to provide a head adjusting device in which angular deviation and tilt angle of front and rear of the magnetic head can be adjusted with simple construction and the number of components can be reduced thereby obtaining inexpensive device.

According to the present invention there is provided a head adjusting device comprising an elastic plate body, a magnetic head fitting member formed by folding the plate body, a magnetic head fixed to the head fitting memeber and provided to the folded portion correspondingly, an azimuth adjusting mechanism provided to the plate body with a predetermined space for adjusting angular deviation of the head, and a tilt adjusting mechanism provided by screwing the head fitting member to the plate body for adjusting tilt angle of front and rear portion of the head with bias force of the head fitting member. The elastic plate body is a cross-shaped member, the longest strip segment of the cross being folded to form the magnetic head fitting member.

BRIEF DESCRIPTION OF THE DRAWING

These and other features and advantages of the present invention will become readily apparent from the following detailed description of one embodiment of the present invention, particularly when taken in connection with the accompanying drawings wherein like reference numerals designate like or functionally equivalent parts throughout, and wherein.

DESCRIPTION OF THE PREFERRED EMBODIMENT

Figure 1:
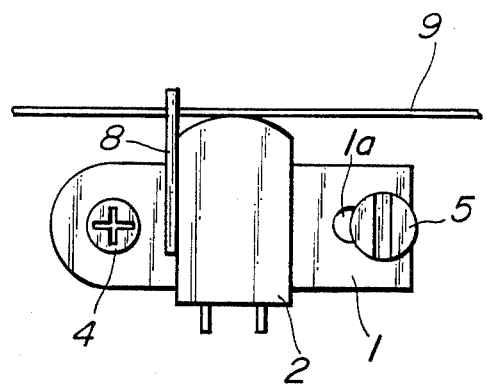
FIG. 1 is a plan view showing a construction of a conventional head adjusting device.
Figure 2:
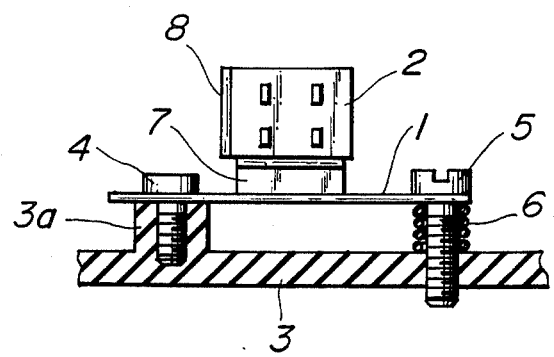
FIG. 2 is a rear elevation illustrating the head adjusting device shown in FIG. 1.

Referring now to the drawings, there is shown an embodiment of a head adjusting device according to the present invention.

Figure 3:
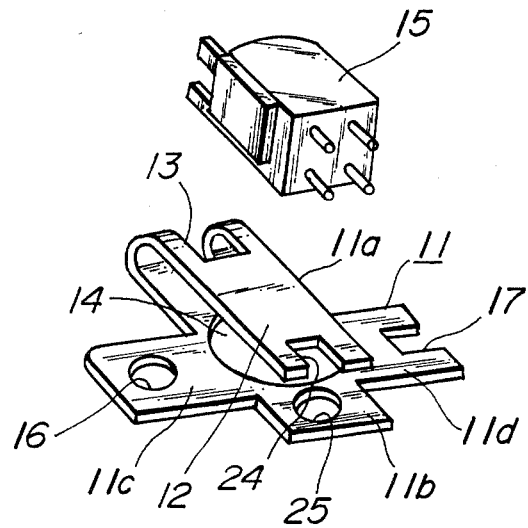
FIG. 3 is a perspective view showing an essential portion of a head adjusting device according to the present invention.
Figure 4:
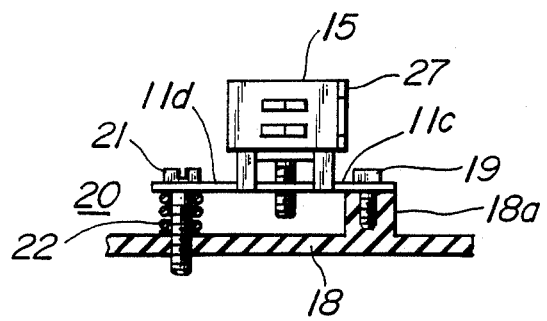
FIG. 4 is a front view illustrating the essential portion shown in FIG. 3.

In FIG. 3, reference numeral 11 is an elastic plate body. In this embodiment the plate body 11 is formed in a cross shape. The cross-shaped plate body 11 has a longest strip segment 11a which is folded to a shortest strip segment 11b extended in the londituginal direction of the segment 11a, thereby forming a magnetic head fitting member 12. The folded portion of the longest strip segment 11a is provided with a rectangular hole 13 in order to fold the strip segment 11a easy and to obtain flexibility. The crossed portion of the cross opposite to the head fitting member 12 is provided with a spot welding hole 14, through which a spot jig is inserted thereby fixing a magnetic head 15 to the head fitting member 12 by spot welding. Then, the head surface of the head 15 corresponds to the folded portion of the strip segment 11a. One strip segment 11c of the cross body 11 is provided with a fitting hole 16 and another strip segment 11d is provided with a rectangular notch portion 17. As shown in FIG. 4 the strip segment 11c is fixed to a holding portion 18a of a base plate 18 of, for example, a super miniaturized cassette tape recorder by a fixing screw 19. An azimuth adjusting 20 for adjusting angular deviation of the head 15 is provided to the strip segment 11d. In this embodiment the azimuth adjusting mechanism 20 is constructed by inserting an azimuth adjusting screw 21 in the notch portion 17 of the strip segment 11d and screwing the screw 21 to the base plate 18 through a coil spring 22.

Figure 5:
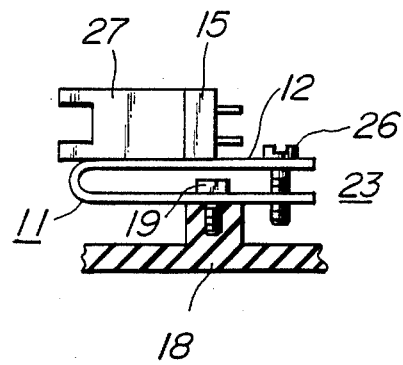
FIG. 5 is a side view illustrating the essential portion shown in FIG. 3.

While the head fitting member 12 is screwed to the plate body 11 thereby forming a tilt angle of front and rear portions of the head 15 with the bias force of the head fitting member 12. In this embodiment the end of the head fitting member 12 is provided with a rectangular notch portion 24 and the shortest strip segment 11b of the plate body 11 opposite to the notch portion 24 is provided with a thread hole 25. As shown in FIG. 5 a tilt adjusting screw 26 is inserted in the notch portion 24 and threaded in the hole 25 thereby forming a tilt adjusting mechanism 23. Reference numeral 27 is a tape guide fixed to the side surface of the head 15 for regurating running path of the magnetic tape.

The function of the head adjusting device according to the present invention is described hereinafter.

When the azimuth adjusting screw 21 of the azimuth adjusting mechanism 20 is loosened the plate body 11 is upwardly rotated around the fixing screw 19 with the elastic force of the coil spring 22. If the screw 21 is fastened the plate body 11 is downwardly rotated by the fastening force of the screw 21. Therefore, the angular deviation of the magnetic head fixed to the head fitting member 12 can freely be adjusted in accordance with the fastening amount of the azimuth adjusting screw 21.

When the tilt adjusting screw 26 of the tilt adjusting mechanism 23 is loosened the magnetic head fitting member 12 is upwardly deviated by its own elastic force around the folded portion of strip segment 11a. If the tilt adjusting screw 26 is fastened the head fitting member 12 is downwardly deviated by the fastening force of the screw 26. Therefore, the tilt angle of front and rear portion of the magnetic head 15 fixed to the head fitting member 12 can freely be adjusted in accordance with the fastening of the screw 26 by elastic force of the head fitting member 12.

According to such construction, therefore, the angular deviation of the magnetic head 15 can easily and smoothly be adjusted by loosening and fastening the azimuth adjusting screw 21 of the azimuth adjusting mechanism 20 thereby obtaining a good high frequency characteristics. The tilt angle of front and rear portions of the head 15 can easily and smoothly be adjusted by loosening and fastening the tilt adjusting screw 26 of the tilt adjusting mechanism 23 thereby obtaining improvements in adherence of head surface of the magnetic head 15 and the magnetic surface of the magnetic tape and good frequency characteristic and level variation.

Moreover, the magnetic head fitting member 12 is formed by folding the elastic plate body 11 thereby obtaining the tilt adjusting mechanism 23 with bias force of the head fitting member 12 so that simple construction can be obtained and the number of components can be decreased resulting in minimized and inexpensive device.

It is further understood by those skilled in the art that the forgoing description is a preferred embodiment of the disclosed device and the present invention is not limited thereto and that various changes and modifications may be made in the present invention without departing from the spirit and scope thereof.

For example, the above explanation describes the cross-shaped elastic plate body, but the plate body is formed in a regular square shape and it is folded on a diagonal line to form a triangle head fitting member, thereby obtaining a tilt adjusting mechanism for adjusting tilt angle of front and rear portion of the magnetic head with bias force of the head fitting member on the vertex of a triangle having the base as the folded portion.

In the above embodiment the azimuth adjusting mechanism is formed with the use of bias force of the coil spring, but it is also formed with the utilization of elastic force of the plate body, so that coil spring can be omitted resulting in inexpensive device.

What is claimed is:

1. A head adjusting device, comprising a plate-like resilient body, said body having a cross-shaped base portion and a folded portion connected to and folded over said base portion and in juxtaposition therewith, said folded portion defining a head fitting member, a magnetic head attached to said head fitting member, an azimuth adjusting mechanism arranged on said base portion and spaced laterally outwardly on opposed sides of said head for adjusting the inclination of said base portion to set the azimuth of said head said azimuth adjusting mechanism includes a fixed screw and an adjustable spring loaded screw, respectively, and a tilt adjusting mechanism arranged on said folded portion and spaced rearwardly of said head for adjusting the inclination of said head fitting member relative to said base portion of said body to set the angle of inclination of said head in a direction transverse of the direction of the azimuth adjustment.

* * * * *